(12) United States Patent
Katsampis

(10) Patent No.: US 7,686,672 B2
(45) Date of Patent: Mar. 30, 2010

(54) BEEHIVE LID

(76) Inventor: Ioannis Katsampis, 13 Polygenous Street, Argos (GR) 21200

( * ) Notice: Subject to any disclaimer, the term of this patent is extended or adjusted under 35 U.S.C. 154(b) by 243 days.

(21) Appl. No.: 11/814,192

(22) PCT Filed: Feb. 8, 2006

(86) PCT No.: PCT/GR2006/000006

§ 371 (c)(1), (2), (4) Date: Jul. 18, 2007

(87) PCT Pub. No.: WO2006/085124

PCT Pub. Date: Aug. 17, 2006

(65) Prior Publication Data

US 2008/0119110 A1 May 22, 2008

(30) Foreign Application Priority Data

Feb. 9, 2005 (GR) .............................. 20050100057

(51) Int. Cl.
*A01K 47/00* (2006.01)
*A01K 47/06* (2006.01)

(52) U.S. Cl. ................................. 449/6; 449/15; 449/25

(58) Field of Classification Search ..................... 449/3, 449/6, 14, 15, 16, 25, 32, 9, 48
See application file for complete search history.

(56) References Cited

U.S. PATENT DOCUMENTS

| 768,370 | A | * | 8/1904 | Jackson | 449/16 |
| 1,607,659 | A | * | 11/1926 | Will | 449/15 |
| 1,911,466 | A | * | 5/1933 | Powell | 449/15 |
| 2,525,251 | A | * | 10/1950 | Willard | 449/17 |
| 3,200,419 | A | * | 8/1965 | Root | 449/2 |
| 4,402,099 | A | * | 9/1983 | Platt, Jr. | 449/30 |

FOREIGN PATENT DOCUMENTS

| CH | 538244 A | 6/1973 |
| FR | 941288 A | 1/1949 |
| FR | 2688381 A | 9/1993 |
| WO | 2004/021773 A | 3/2004 |

* cited by examiner

*Primary Examiner*—Rob Swiatek
(74) *Attorney, Agent, or Firm*—Roylance, Abrams, Berdo & Goodman, L.L.P.

(57) ABSTRACT

The lid of the beehive has a split open top held by a mechanism to the one side of the body of the lid. By opening the top of the lid a surface is revealed which has containers on the one side and an easily open cover on the other, which enables immediate access into the internal of the hive. On the top of the lid there are shutters that open and close the air intake holes. The hive has a folding take off board on its bottom reducing space during transportation. It uses dovetail joints to hold the sidewalls making the beehive very durable.

18 Claims, 2 Drawing Sheets

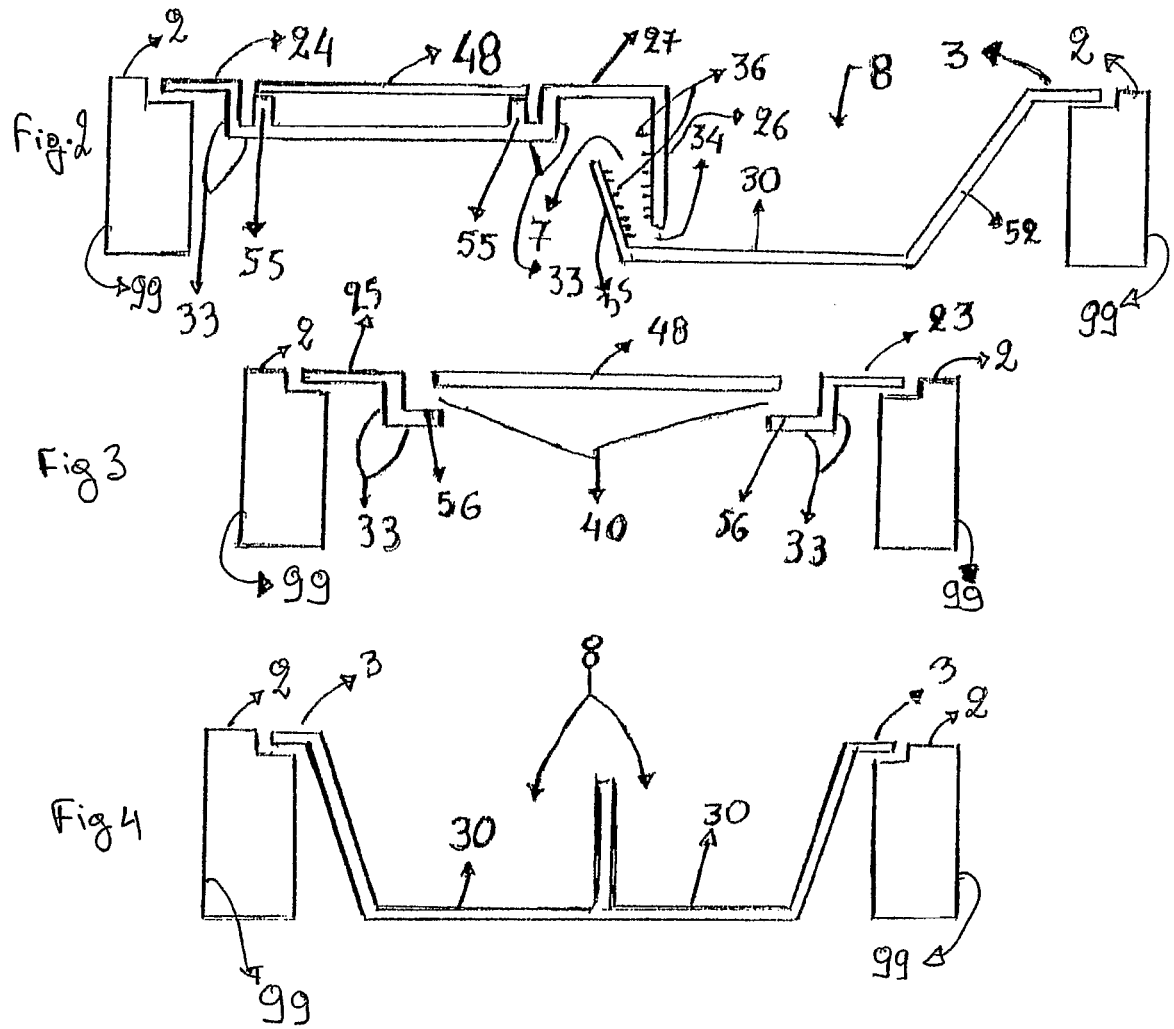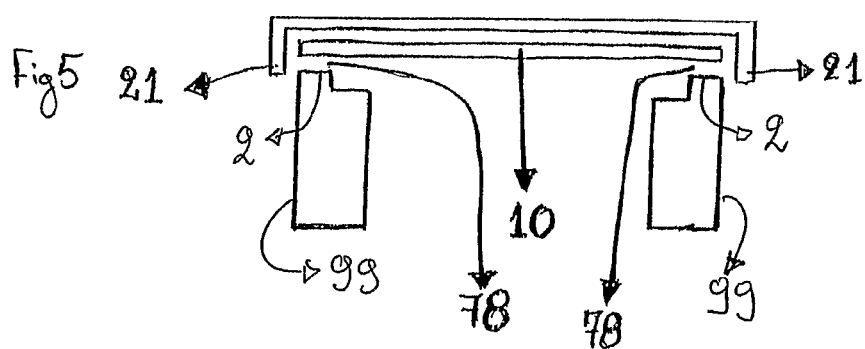

BEEHIVE LID

CROSS-REFERENCE TO RELATED APPLICATIONS

This application is an U.S. national phase application under 35 U.S.C. §371 based upon co-pending International Application No. PCT/GR2006/000006 filed on Feb. 9, 2006. Additionally, this U.S. national phase application claims the benefit of priority of co-pending International Application No. PCT/GR2006/000006 filed on Feb. 9, 2006 and Greek Application No. 20050100057 filed on Feb. 9, 2005. The entire disclosures of the prior applications are incorporated herein by reference. The international application was published on Aug. 17, 2006 under Publication No. WO 2006/085124.

BACKGROUND OF THE INVENTION

1. Field of the Invention

This invention generally refers to a beehive, specifically to its lid which has a top that opens and closes and under this exist containers and an opening with a removable cover, which has air intake holes with shutters that open and close. The beehive has a special way to tie its woods or sides together, and a special take off board at the bottom of the beehive.

2. Description of the Prior Art

In the beehives up to this time the lid covers the body of the hive and enables air circulation through the air intake holes. In order to work with the bees the lid has to be taken off with force because it has been glued with "propolis" by the bees. This fact stimulates and stresses the bees demanding much time and work by the apiculturist, and makes smoking the bees a necessity. The smoking though has the disadvantage of transferring all toxic substances to bees' products. The stimulation has the side effect of consuming honey and pollen by the bees, some bees' deaths, as well as looting from nearby beehives. Additionally in the lid and in the hive in general, nails and screws are being used to hold the wooden boards together resulting in the boards to loose tie and crack. The take off board is an extension of the bottom of the hive.

The beehive lid according to the current invention not only covers the body of the hive but also enables all the works inside the hive to take place under all weather conditions, without taking the lid off and without the need to smoke the bees, which results to less time and work needed by the apiculturist. This way we don't stimulate the bees, avoiding the consumption of honey and pollen, as well as the looting from nearby beehives. Using the lid of the present invention, the apiculturists are able to watch the bees inside the hive without disturbing them. The lid of this hive has to be taken off only when we have to work with the boards inside the hive. By adjusting the shutters of the air intake holes the apiculturist helps the bees to overcome any weather conditions. The lid and the body of the hive don't crack, don't loose tie nor rot because the sideboards are use dovetail joints to be held together and not nails nor screws. The space needed for the transportation of the hive is reduced because the take off board of the bottom flaps upwards blocking the main door and not permitting the bees to exit but allowing the air intake to remain open because of its riddled construction. The size of the take off board can be lengthened in order to help the flying of the bees.

Arrangements of the above type are known for example from:

U.S. Pat. No. 4,546,509 A/HUETTER patent refers to a beehive, which permits more than one colony of bees in the same beehive with separate queen to collect and store honey, and is irrelevant to my invention.

U.S. Pat. No. 2,340,219 A/G. B. LEWIS COMPANY refers to beehives of generally conventional construction having improved rests or frame supporting members and is irrelevant to my invention.

U.S. Pat. No. 129,464 A/CUNNINGHAM refers to the general construction of the beehive and not to a lid that opens and therefore is irrelevant to my invention.

U.S. Pat. No. 4,736,479 A/LAGERMAN refers to a method of beekeeping and not the lid of the beehive and therefore is irrelevant to my invention.

GR20020100010 A PANAGIOTAKIS K. refers to a mechanism of honey extraction and therefore is irrelevant to my invention.

U.S. Pat. No. 4,199,832 GLASSCOCK ET AL. refers to a beehive constructed with special material as foam e.t.c. and therefore is irrelevant to my invention.

U.S. Pat. No. 2,300,772 A/BORLAND refers to beehive body and frame construction and therefore is irrelevant to my invention.

SUMMARY OF THE INVENTION

In view of the foregoing disadvantages inherent in the known types of beehives now present in the prior art, the present invention provides an improved beehive, and overcomes the above-mentioned disadvantages and drawbacks of the prior art. As such, the general purpose of the present invention, which will be described subsequently in greater detail, is to provide a new and improved beehive which has all the advantages of the prior art mentioned heretofore and many novel features that result in a beehive which is not anticipated, rendered obvious, suggested, or even implied by the prior art, either alone or in any combination thereof.

My invention differs from all the above inventions because it has a lid that splits open and has internal mechanisms of feeding, attending and watching the bees. Additionally, the present invention has shutters on the air intake holes, and because it uses dovetail joints to hold the sidewalls together and because it uses a folding take off board so is irrelevant to all inventions mentioned before.

In my invention the top of the lid is connected to its body with a connecting mechanism allowing it to open and close. The surface under the top has two sections, the one has containers where liquids are placed and in the other there is an opening through which the apiculturist can watch, feed and do whatever work needs immediate contact with the bees. A removable cover covers the opening. The air intake openings are covered with shutters attached to the top of the lid with a connecting mechanism. The beehive has a take off board attached to its bottom with a folding mechanism allowing it to open and close. The beehive uses dovetail joints on the sidewalls.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a longitudinal section of the lid at the point where it touches the cover of the internal opening from point A to B of FIG. 1.

FIG. 3 is a section of the lid of the hive from point C to D in the middle of the internal opening of FIG. 1.

FIG. 4 is a section from point E to F in the middle of the containers of FIG. 1.

FIG. 5 is a section of the top and the sidewalls of lid from point G to H of FIG. 1.

The same reference numerals refer to the same parts throughout the various figures.

DESCRIPTION OF THE PREFERRED EMBODIMENT

Figure 1:
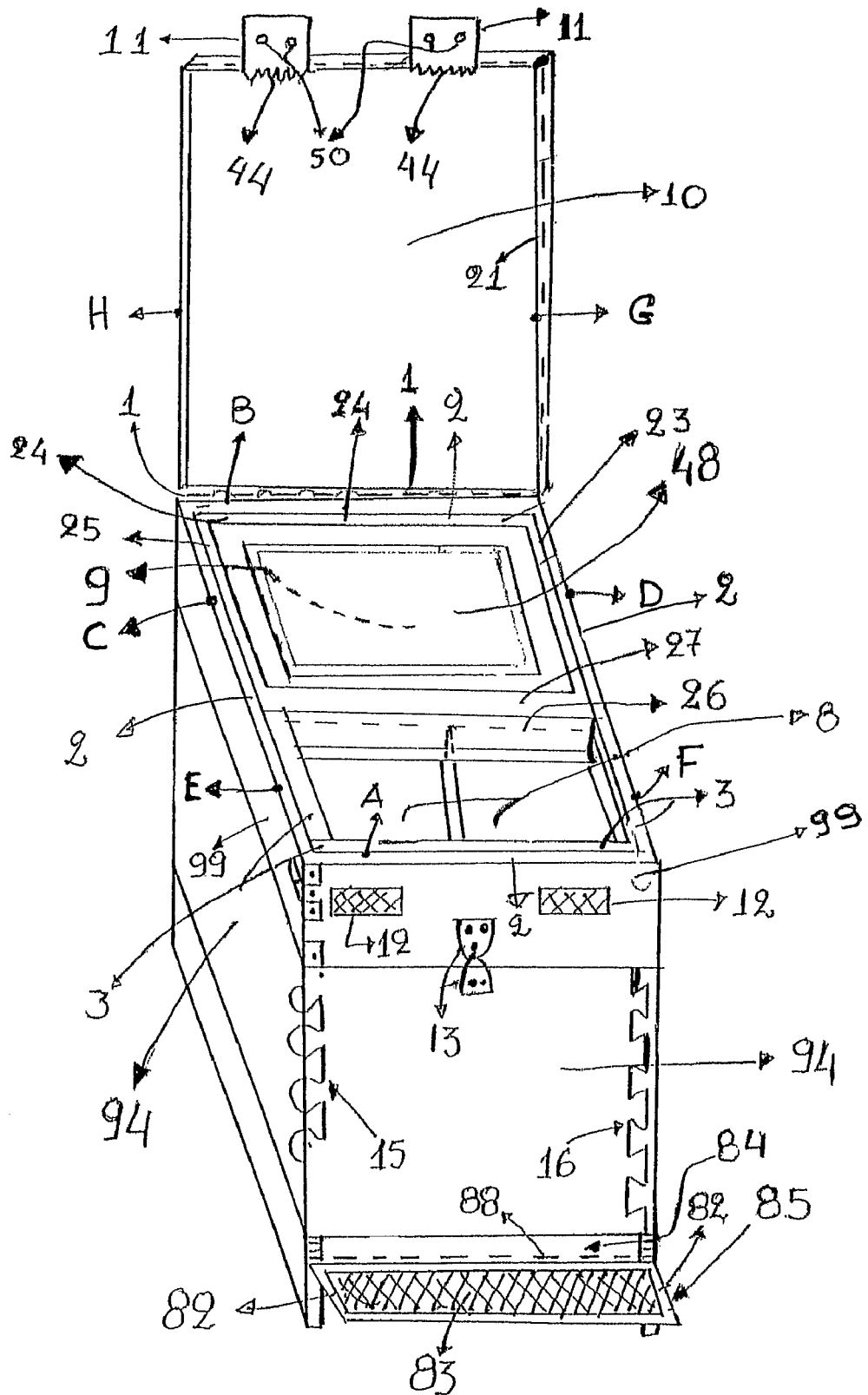
FIG. 1 shows a whole beehive with all the details of the invention.

Referring now to the drawings, and particularly to FIGS. 1-5, a preferred embodiment of the beehive of the present invention is shown and generally designated by the reference numeral (10).

FIG. 1 shows the top of a beehive lid (10) open and connected to one side of a body (99) of the lid with a connecting mechanism enabling it to open and reveal the containers (8), an opening (9), a removable cover (48) of the opening (9) and an upper surface (2) of the body (99) of the lid.

In the containers (8) can be placed any liquid the apiculturist want the bees to take. The liquid is being transferred through a gap (34) and fills a space (7) of the containers where the bees can take it from. The removable cover (48) fits to a groove (33), as shown in FIG. 3, of surfaces (23, 24, 25, 27) shown in FIGS. 1, 2, and 3.

A surface or side (26) is an extension of the surface (27) inclining into the containers, shown in FIGS. 1, and 2, leaving the gap or empty space (34) between surface (26) and a bottom (30) of the containers (8). The empty space (34) is of such a construction allowing the liquids to pass through to empty space (7) while prohibiting the bees to exit the hive. A side (35) of the container is lower than the other sides allowing the bees to enter the empty space (7) of the containers, see FIG. 2. On the sides (35, 26) of the empty space (7) there are stripes (36) helping the bees to clime up easily from space (7) after they take the liquids from the containers and return to inside the body (99) of the hive without drowning. The surfaces (23, 24, 25, 3) hold the containers (8) and the removable cover (48) in the body of the lid and prohibit the bees to contact the top of the lid, as shown in FIGS. 1, 2, 3, and 4.

The top of the lid (10) is covered by a metallic sheet (21), which emerges around the top of the lid (10) in order to protect the lid from the rain and wind. The sheet comes down to cover a gap (78) between the top of the lid (10) and the body (99) of the lid, as shown in FIGS. 1, and 5.

The front and the back of the body (99) have air intake openings (12). Shutters (11) are attached to the top (10) of the lid with a connecting mechanism (44) allowing them to open and close in front of the air intake holes (12) in order to cover them if needed. On the shutters (11) there are nails (50) that go into the air intake holes (12) holding the top (10) of the lid down, so it cannot be opened by the blowing wind when the shutters are closed. The nails (50) are only on the shutters (11) of the opening side of the top of the lid (10). A mechanism (13) holds the body (99) of the lid with a body (94) of the hive. There are two of the mechanisms (13) each on an opposite side. A front side (52) of the containers (8) is inclined so as it leaves a gap between the container and the front panel of the body (99) of the lid. This gap allows air to pass through to the body of the hive. Projections (55) on the four corners of the grooves (33) of the opening, as shown in FIG. 2, are holding the removable cover (48) a bit higher than a lower (56) part of the grooves (33), to the same height of the surfaces (27, 24, 23, 25) leaving a gap between the grooves and the removable cover (48) so as the propolis can be removed with the use of a thin knife. A gap (40) defined between the removable cover (48) and the lower part (56) is smaller than the bee, not allowing it to exit towards the top (10) of the lid. The space between the surface of the removable cover (48), the containers and the top (10) of the lid provides an extra isolation layer because of the air trapped in.

The joints between the sides (94) of the hive are made with dovetails (15, 16), as shown in FIG. 1, and use some glue. The folding take off board (85) is held on the bottom of the hive with a mechanism (88). The take off board (85) may be longer (82) than usual helping bees to fly and their return to a main entrance (84).

The ability for the beehive of the present invention to fold in front of the main entrance assists in its transportation because of its reduced size. The folding aspect blocks the main entrance thereby not allowing the bees to exit the beehive. Furthermore, the beehive has a riddled construction which allows for air circulation.

While a preferred embodiment of the beehive has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A beehive lid for covering a hive, the beehive lid comprising:
   a top cover that opens using a connecting mechanism, under the top cover there is a surface attached to sidewalls of the lid which has an opening that is being covered by a removable cover; and
   containers covered by the top cover, the containers being adapted for liquid placement therein;
   wherein one side of the surface of the lid is inclined coming down into the containers leaving a gap between its end and a bottom of the containers through which liquids are being transferred inside a body of the lid to a space, the space being defined by walls having stripes and adapted to help bees to climb up and to prevent immediate contact with the top of the lid;
   wherein the top cover being adapted to give a user the ability to have immediate access to the liquids placed in the containers without having any contact with the bees, wherein the top cover being adapted to give the user the ability by opening the removable cover to place or take anything inside, on the top cover of the lid there are shutters that open having the ability to be adjustable helping that way the bees to overcome any extreme weather conditions, when the shutters are closed they cover air intake holes, all the above are being done without taking the lid off and without smoking the bees avoiding this way to transferring the toxic substances of the smoke to bees' products.

2. The beehive lid according to claim 1, wherein a clear or riddled cover is adapted to slide in, after lifting the removable cover off, in order to watch the inside of the hive without allowing the bees to exit.

3. The beehive lid according to claim 1 further comprising a take off board attached to a bottom of the hive with a folding mechanism enabling the take off board to fold upwards gaining space during transportation of the hive, the take off board having a riddled construction giving ability of air intake, the take off board being extendable in size.

4. The beehive lid according to claim 1, wherein sidewalls of the hive being joined by dovetail joints with the use of glue to prevent the rotting of the hive.

5. The beehive lid according to claim 1 further comprising a metallic sheet covering the top cover and which emerges around the top cover in order to protect the lid from the rain and wind, the metallic sheet being adapted to extend down to cover a gap between the top cover and the body of the lid.

6. The beehive lid according to claim 1, wherein the surface attached to the sidewalls of the lid further comprising at least one projection adapted to hold the removable cover to a height level with the surface.

7. The beehive lid according to claim 1, wherein one of the walls defining the space is a skid extending from the bottom of the containers, the skid being lower than other sides of the containers allowing the bees to enter the space.

8. The beehive lid according to claim 1, wherein the shutters further comprising nails adapted to be received into the air intake holes thereby holding the top cover of the lid down.

9. A beehive system comprising:
   a beehive body having sidewalls joined to form an enclosure having a bottom;
   a take off board attached to the bottom of the beehive body via a folding mechanism enabling the take off board to fold upwards;
   a lid body held to the beehive body by a holding mechanism on opposite sides of each other, the lid body having sidewalls featuring an upper surface, an opening defined therethrough, and at least one air intake opening defined through at least one of the sidewalls;
   at least one at least one container receivable within the lid body, the at least one container having at least a surface, a bottom and a skid angularly extending from the bottom away from the surface, the surface being supported by the at least three sidewalls of the lid body;
   a plurality of surfaces supported by at least three of the sidewalls of the lid body, the surfaces having grooves, projections on four corners of the grooves, and an additional surface which is an extension of one of the surfaces and is inclining into the at least one container defining a gap between its end and the bottom of the at least one container and a space between the surface and the skid of the at least one container;
   a removable cover receivable into the grooves and held by the projections at a height level with the surfaces thereby defining a gap between a lower part of the grooves and the removable cover, the removable cover being adapted to cover the opening defined in the lid body;
   a top cover connected to the lid body via a connection mechanism enabling the top cover to open and reveal the at least one container, the opening of the lid body, the removable cover, the surfaces, and the upper surfaces of the lid body; and
   at least one shutter attached to the top cover via a connecting mechanism allowing the at least one shutter to open and close in front of the air intake hole.

10. The beehive system according to claim 9, wherein the gap between the edge of the additional surface and the bottom of the at least one container being adapted to allow a liquid to pass through to the empty space while prohibiting bees to exit the beehive body.

11. The beehive system according to claim 9, wherein the skid of the at least one container and the additional surface of the surfaces each having stripes directed to each other and into the space, the stripes being adapted to assist the bees to climb and to prevent immediate contact with the top cover.

12. The beehive system according to claim 9, wherein the take off board having a riddled construction adapted for air intake, and wherein the take off board is foldable.

13. The beehive system according to claim 9, wherein the sidewalls of the beehive body being joined by dovetail joints with the use of glue to prevent rotting of the beehive body.

14. The beehive system according to claim 9, wherein the at least one shutter further comprising nails adapted to be received into the air intake holes thereby holding the top cover down.

15. The beehive system according to claim 9, wherein the surface of the at least one container is the front side of the at least one container which is inclined defining a gap between the at least one container and at least one of the sidewalls of the lid body, the gap being adapted to allow air to pass through to the beehive body.

16. The beehive system according to claim 9, wherein the gap defined between the removable cover and the lower part of the grooves of the surfaces is adapted to prevent the bees from exiting therethrough.

17. The beehive system according to claim 9, wherein the at least one container is a plurality of containers.

18. The beehive system according to claim 9, wherein the at least one air intake hole of the lid body is a plurality of air intake holes, each having a corresponding shutter attached to the top cover.

* * * * *